Dec. 9, 1958 A. F. MEYER 2,863,797
ART OF MANUFACTURING REINFORCED PLASTIC ARTICLES
Filed May 22, 1956
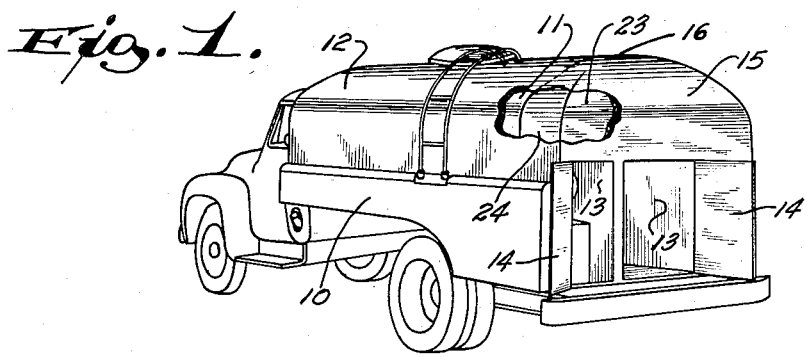
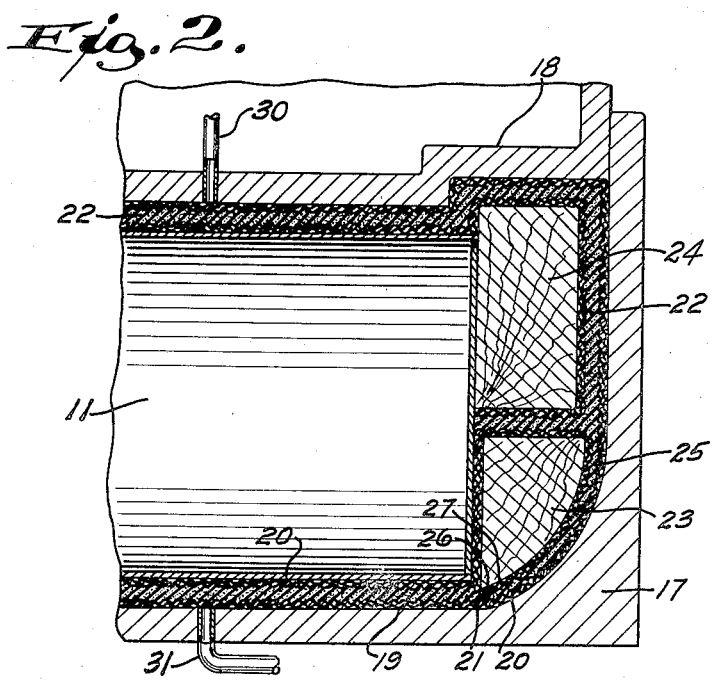
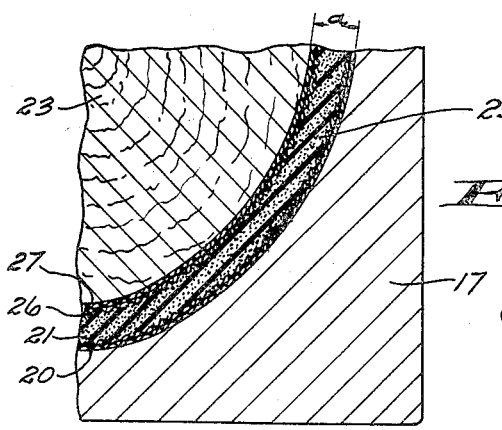
INVENTOR.
Arnold F. Meyer
BY
ATTORNEYS.

United States Patent Office 2,863,797
Patented Dec. 9, 1958

2,863,797

ART OF MANUFACTURING REINFORCED PLASTIC ARTICLES

Arnold F. Meyer, Pewaukee, Wis., assignor to The Heil Co., Milwaukee, Wis., a corporation of Wisconsin Application May 22, 1956, Serial No. 586,423

2 Claims. (Cl. 154—83)

This invention relates to improvements in the art of manufacturing reinforced plastic articles.

The present invention relates in general to that class of plastic article wherein there is an external coating of plastic material, such as a polyester resin, which is suitably reinforced as by a fibreglass skin and/or fibreglass mat, which skin and mat become impregnated with the plastic material. In structures which have compound curves or rounded corners it is difficult to maintain the fibreglass skin and/or fibreglass mat in firm contact with the curved cavity portion of the female mold member during the impregnation with the liquid plastic material. Quite often the fibreglass skins tend to stretch across the curved portions of the mold, rather than to conform, leaving external spaces between the fibreglass skins and the surface of the mold. As a result, when the plastic material, such as a polyester resin, is injected into the mold it will flow into any such external spaces, causing too great a concentration of resinous material which is not reinforced by fibreglass. Such unreinforced concentrations of plastic are inclined to crack and check during use.

This problem is particularly acute in the manufacture of transportation tanks, such as bulk milk pickup, wherein there is a cylindrical metal tank to be coated with plastic, and wherein there are utility compartments at the lower portion of the rear of the tank, with the upper portion of the body above the compartments comprising compound curves which blend into the rear end of the tank. Above the compartments and within these compound-curved portions are wood filler blocks to fill in this waste space and which must be shaped to conform to the compound curvatures of the mold, the plastic coating being molded onto the outside of the filler blocks. In this type of article it is very difficult to make the filler blocks perfect in shape, with the result that wherever any lack of conformity with the shape of the mold occurs, the problem of external unreinforced plastic concentrations is present.

It is a general object of the present invention to provide a method of manufacturing plastic articles wherein novel procedure is utilized to maintain the fibreglass skin and/or mat in tight contact with the surface of the mold during the molding operation, and thereby prevent undesired concentrations of unreinforced plastic material.

A more specific object of the invention is to provide a method as above described wherein a resilient material, such as a resilient synthetic foam, under compression is employed in the space between the filler and the mold which serves to keep the fibreglass skins in firm contact with the cavity of the female mold member, regardless of the type of curvature present, and regardless of the accuracy of the external curvatures on the filler blocks.

A further object of the invention is to provide an improved plastic article manufactured by the improved method.

With the above and other objects in view, the invention consists of the improvements in the art of manufacturing reinforced plastic articles, and all of its parts, combinations and steps, and all equivalents thereof.

In the accompanying drawings, illustrating one complete embodiment of the preferred form of the invention, in which the same reference numerals designate the same parts in all of the views:

Fig. 1 is a perspective view of a bulk milk pickup tank formed in accordance with the present invention, part of the outer coating being broken away;

Fig. 2 is a fragmentary longitudinal sectional view through a mold while it is being used to form a transportation tank of the type shown in Fig. 1; and Fig. 3 is an enlarged longitudinal vertical sectional view through the female mold member showing the formation of the curved portion only.

Referring more particularly to the drawings, the numeral 10 designates a plastic coated bulk milk pickup tank vehicle which includes a cylindrical metal tank portion 11 having a plastic coating 12. At the rear of the lower portion of the tank are rear compartments 13 having doors 14 as is common practice. Above the compartments 13 the vehicle body curves upwardly and forwardly in compound curves as at 15 to meet the top 16 of the rear end of the cylindrical tank portion 11. It is in connection with the formation of the plastic coating over the compound-curved portion 15 where the present invention is particularly useful, although it is also useful at rounded-corner portions. It is to be also understood that there are various other articles than bulk milk pickup tanks, where similar problems are present and where the invention is applicable.

Referring more particularly to Fig. 2, the numeral 17 designates a female mold member and the numeral 18 a male mold member co-operable therewith. Located within the mold is a metal tank 11 which is to be coated. Within the recess 19 of the female mold member a skin of fibreglass cloth 20 is laid (see Fig. 3). There may also be fibreglass matting 21 on top of the fibreglass cloth 20. In addition, surrounding the tank 11 is a filler of shaped pieces of insulating filler material such as balsa wood 22.

In one end of the mold is one or more shaped wood filler blocks 23, preferably of balsa wood or any other material having similar physical properties including shear strength in bonding with the resin. Polyurethane foam may be employed. Above the filler material 23 are removable cores 24, one for each of the rear compartments 13 of the tank vehicle.

As an important step of the present invention, instead of having the compound-curved fillers 23 of a size to fit relatively closely against the curved portion of the mold cavity, the filler material 23 is made so as to leave substantial clearance to accommodate a preformed layer or blanket of a resilient foam material 25, such as a synthetic foam. This may be any material having the required resiliency and which is capable of exerting forces when compressed. Synthetic cellular plastic material such as vinyl foam or latex foam may be employed, or a polyester-diisocyanate foam, sometimes referred to as polyurethane. It is preferred that it be semi-rigid but flexible, and that it be a material to which the liquid plastic will readily bond.

Referring more particularly to Fig. 3 it will therefore be apparent that the curved portion of the mold has fibreglass skin or cloth 20 laid therein and preferably also fibreglass matting 21 on top of the fibreglass cloth 20, although this matting is not essential. Next is the layer 25 of resilient foam of substantial thickness, then preferably a layer of fibreglass matting 26 and then another layer of fibreglass cloth 27, which is against the surface of the wooden filler blocks 23.

Referring to Fig. 3, the space (*a*) is somewhat larger than would normally be left between the filler blocks and the mold, and in the case of Fig. 1 is preferably about ¾", and the resilient foam material 25 plus the fibreglass layers have a normal thickness greater than the thickness (*a*) so that the resilient foam material, preferably about ½" thick, is under compression due to the weight of the members thereon as in Fig. 2. This state of compression must be such that the foam material 25 will develop at least as much, and preferably more pressure against the fiberglass cloth and mat 20 and 21, than the liquid pressure of the plastic material which is to be injected.

In the molding of the article shown in Fig. 1 the liquid pressure of the plastic material is five to six pounds per square inch, so the compressed foam material 25 must develop at least as great a pressure against the fibreglass skin. As a result of this arrangement the skins 20 and 21 are held firmly against the contour of the mold cavity, regardless of imperfections in the external shape of the wooden filler 23.

Without the present method it would normally be conventional procedure to have the exterior of the filler blocks 23 closer to the mold cavity, leaving enough room for the fibreglass and plastic material. However, there was no way of insuring that the fibreglass would conform to the mold cavity, and if there were any imperfections in the surface of the filler blocks 23 the skins 20 and 21 were inclined to follow such imperfections and stretch across curved surfaces of the mold, leaving external spaces in which undue concentrations of plastic material occurred.

With the present invention, after the materials are in proper assembled relationship, and before final molding pressure is exerted by the male mold member, the plastic material, such as a polyester resin, is injected with a pressure of five to six pounds per square inch through an inlet such as the inlet 31 into the spaces around the metal tank 11 and into the spaces between the mold and filler material 23. A polyester resin may be employed which is initially virtually water-thin in consistency and which may be polymerized by heat or by catalysts or additives. Other suitable resins are thermoplasts and thermo-setting types wherein heat liquifies the material or solidifies the material, respectively. The liquid plastic will then flow under pressure around the tank 11 and between the flexible foam material 25 and the mold to thoroughly impregnate the fibreglass cloth and mattings 20, 21, 26 and 27 before final molding pressure is exerted. Thereafter the male mold member 18 is lowered into final position in the mold 17 and forced down to a point so as to determine the final thickness of the coating around the tank 11. During such lowering operation the lower face of the male mold member 18 engages the plastic liquid in the lower mold and forces it up around the sides of the tank 11 to form the side wall coatings. One or more events or risers 30 are provided in the upper mold member so that air and also liquid material may well up into the risers 30 as well as around the sides of the molds when the upper mold member is forced downwardly. The liquid material then hardens to form a plastic coating which is reinforced by the fibreglass cloth 20 and matting 21, the tank 11 being insulated by said coating and by the insulating filler 22. Due to the fact that the compressed resilient foam material 25 has been holding the fibreglass skin 20 and mat 21 firmly against the concavity of the mold, such skin and mat have not been displaced by the plastic liquid and there will be no spaces between the mold and the skin 20 which are filled with too heavy a layer of plastic material. Furthermore, when final molding pressure takes place the resilient foam material 25 is still further compressed to keep the skins 20 and 21 even more firmly in position. Thus there are no undue external concentrations of plastic material, which are not reinforced by fibreglass, to cause checking and cracking, such checking and cracking occurring whenever there is too thick an unreinforced section of plastic.

With the present method it is unnecessary to worry about the perfection of the external curvature of the wood filler material 23 because the resilient foam material will maintain the skins in firm contact with the mold regardless of how well the surface of the filler material conforms to the surface of the mold. Heretofore where there was poor conformity, waviness in the fibreglass skin 20 was likely to occur. The resilient foam material 25 may be any material capable of being under a state of compression in the mold and of exerting the required pressures during the molding operation.

While the illustrated embodiment shows the invention used around the false upper rear end portion of a bulk milk pickup tank, it is obvious that strips of resilient foam may be used in any curved corner of a mold where problems of this type are presented, and where strength is not required. In the curved upper rear portion of a bulk milk pickup tank the unused portion which is filled with the filler material 23 performs no function, and therefore no great strength in the coating is required.

Various changes and modifications may be made without departing from the spirit of the invention, and all of such changes are contemplated as may come within the scope of the claims.

What I claim is:

1. In a method of applying a reinforced fabric coating to an article which is to have a curved surface over a filled-in space which curved surface is to match a curved portion of a mold cavity, the steps of laying reinforced fabric over said curved portion of the mold cavity to cover said curved portion, laying inherently resilient cured foam material against said reinforcing fabric to cover the latter, preparing wooden filler blocks having an external shape to substantially conform to the curvature of the mold cavity, filling the space between the article and said resilient foam material with said blocks, partially compressing the resilient foam material between said filler blocks and the fabric-covered curved portions of the mold cavity so that the tendency of the resilient foam material to return to original condition exerts a pressure which maintains the fabric in firm contact with the curved portion of the mold cavity, and causing a hardenable liquid plastic material to flow into the mold cavity between the filler blocks and foam material and between the latter and the mold with sufficient pressure to impregnate said fabric and thereby form a fabric-reinforced external coating, the pressure exerted by the compressed foam material being at least as great as the pressure exerted by the liquid plastic material to prevent concentrations of the latter between the outer side of the skin and the mold, and said filler blocks being relatively rigid as compared with the inherently resilient foam material.

2. In a method of applying a reinforced fabric coating to a transportation tank body which is to have a curved surface over waste space behind the upper portion of the tank proper, which curved surface is to match a curved portion of a mold cavity, the steps of laying reinforced fabric over said curved portion of the mold cavity to cover said curved portion, laying inherently resilient cured foam material against said reinforcing fabric to cover the latter, preparing filler blocks of a shape to fill said waste space and with an external surface contour to substantially conform to the curvature of the mold cavity, inserting said blocks between said tank body and the inherently resilient foam material to substantially fill said waste space, partially compressing the resilient foam material between said external surface of said filler blocks and the fabric-covered curved portions of the mold cavity so that the tendency of the resilient foam material to return to original condition exerts a pressure which maintains the fabric in firm contact with the curved portion of the mold cavity, and causing a hardenable liquid plastic material to flow into the mold cavity with sufficient pressure to impregnate said fabric and thereby form a fabric-reinforced external coating, the pressure exerted by the compressed foam material being at least as great as the pressure exerted by the liquid plastic material to prevent concentrations of the latter between the outer side of the skin and the mold, and said filler blocks being relatively rigid as compared with the inherently resilient foam material.

References Cited in the file of this patent

UNITED STATES PATENTS

| | | |
|---|---|---|
| 2,414,125 | Rheinfrank | Jan. 14, 1947 |
| 2,482,798 | Rheinfrank et al. | Sept. 27, 1949 |
| 2,493,032 | Rheinfrank | Jan. 3, 1950 |
| 2,495,640 | Muskat | Jan. 24, 1950 |
| 2,773,792 | Nebesar | Dec. 11, 1956 |

FOREIGN PATENTS

| | | |
|---|---|---|
| 672,144 | Great Britain | May 14, 1952 |